United States Patent [19]
Williams

[11] Patent Number: 5,289,379
[45] Date of Patent: Feb. 22, 1994

[54] LAND VEHICLE SUSPENSION CONTROL SYSTEM

[75] Inventor: David A. Williams, Milton Keynes, United Kingdom

[73] Assignee: Group Lotus PLC, Norfolk, United Kingdom

[21] Appl. No.: 777,215

[22] PCT Filed: May 4, 1990

[86] PCT No.: PCT/GB90/00691
§ 371 Date: Dec. 19, 1991
§ 102(e) Date: Dec. 19, 1991

[87] PCT Pub. No.: WO90/13449
PCT Pub. Date: Nov. 15, 1990

[30] Foreign Application Priority Data
May 4, 1990 [GB] United Kingdom ............... 8910274

[51] Int. Cl.$^5$ ............................................. B60G 17/00
[52] U.S. Cl. ................................. 364/424.05; 280/707
[58] Field of Search ................. 364/424.05; 280/707, 280/840

[56] References Cited

U.S. PATENT DOCUMENTS

| | | | |
|---|---|---|---|
| 4,579,366 | 4/1986 | Doi et al. | 280/707 |
| 4,696,489 | 9/1987 | Fujishiro et al. | 280/707 |
| 4,700,971 | 10/1987 | Doi et al. | 280/707 |
| 4,787,649 | 11/1988 | Watanabe et al. | 280/707 |
| 4,825,370 | 4/1989 | Kurosawa | 364/424.05 |
| 5,037,128 | 8/1991 | Okuyama et al. | 280/707 |
| 5,089,966 | 2/1992 | Fukushima et al. | 280/707 |
| 5,141,245 | 8/1992 | Kamimura et al. | 280/707 |

FOREIGN PATENT DOCUMENTS
0114757 8/1984 European Pat. Off. .
WO89/00512 1/1989 PCT Int'l Appl. .

Primary Examiner—Gary Chin
Attorney, Agent, or Firm—Westman, Champlin & Kelly

[57] ABSTRACT

A land vehicle suspension control system comprising an actuator connected between a sprung mass of the vehicle and an unsprung mass of the vehicle, which actuator comprises a piston moveable with a cylinder and dividing the cylinder into at least two chambers; a source of pressurized fluid; and exhaust for fluid; a valve mechanism controllable by a control signal for selectively connecting at least one of the chambers to the source of pressurized fluid or the exhaust for fluid and for controlling the rate of flow fluid to and from the chambers; a sensor device for determining forces applied to the sprung mass by the actuator and the unsprung mass and for generating signals corresponding thereto; a processor device for processing signals generated by the sensor device and for generating a velocity demand control signal to control the valve mechanism, the velocity demand signal demanding a relative velocity between the sprung mass and the unsprung mass and the valve mechanism controlling the flow of fluid to the actuator in response to the velocity demand signals; a mechanism for measuring the extension of the actuator and for generating a signal corresponding thereto; a device for calculating from the velocity demand signal a calculated position signal corresponding to an extension required of the actuator; a device for comparing the calculated position signal with the signal generated by the mechanism for measuring the extension of the actuator and for generating an error signal proportional to the difference therebetween; wherein the velocity demand signal and the error signal are both used to control the valve mechanism which is controlled to drive the error signal towards zero.

3 Claims, 4 Drawing Sheets 3,289,379

LAND VEHICLE SUSPENSION CONTROL SYSTEM

BACKGROUND OF THE INVENTION

This invention relates to a land vehicle suspension control system.

By "land vehicle" is meant a vehicle adapted for motion over the land in contact therewith, examples being motor cars, motor cycles, tractors and tracked vehicles.

In particular, the invention relates to a land vehicle suspension control system for a land vehicle having an active suspension system.

An active suspension system is a suspension system in which conventional suspension components, such as springs and dampers, are assisted or replaced by actuators operable, for example in response to command signals from a microprocessor, to correct, change or control the attitude of the vehicle. An aim of such active suspension systems is to minimize variations in the forces experienced by the vehicle body, thereby improving vehicle safety and enhancing driver and passenger comfort.

The command signals which control the actuators are generally derived from measured values of a number of variables defining the vehicle's attitude. In a truly active suspension system, there is the capability of controlling the actuators to respond to measured road inputs, that is due to perturbations in the road surface, while the actuators can be controlled not to extend and contract in response to loads imposed on the vehicle suspension by virtue of vehicle acceleration and cornering and loads carried in the vehicle.

Active suspension systems are well known. For example, EP-A-0114757 discloses an active suspension system for a four wheeled motor vehicle in which force measurements are taken at the points of support of the vehicle body on each wheel/hub assembly and processed to produce a demanded output of the actuator secured to operate between the respective wheel/hub assembly and the vehicle body.

The attitude of the vehicle can then be controlled by converting the forces measured at the points of support to a set of modal forces (e.g. heave, pitch, roll and warp forces), from which the actuator outputs required to overcome the combined modal forces in order to maintain the desired attitude of the vehicle are then calculated.

A significant advantage of such an active suspension system is that the suspension characteristics of the vehicle can be continuously altered to accommodate varying road conditions and/or operating conditions of the vehicle. This facility permits the construction of a vehicle which has improved safety characteristics, since it is possible to maintain a greater degree of contact of the vehicle wheels with the land, and the behaviour of the vehicle is likely to be more predictable to the driver, than in the case of a vehicle not having an active suspension system.

Known active suspension systems include means for manipulating the values of the modal forces to produce a demanded output of actuator means arranged to oppose the modal forces, thereby maintaining a constant force on the vehicle body.

However, previous control systems used in conjunction with active suspension systems have operated on the principle of producing a demanded position of the actuator means and operating the actuator means accordingly. The actuator means generally includes a hydraulic actuator operating between each wheel/hub assembly and the body the of vehicle.

The frequency response of an electro-hydraulic actuator can be improved dramatically if the control processor can be arranged to output a velocity, rather than displacement demand. When this is the case the primary input to the actuator is a velocity demand.

SUMMARY OF THE INVENTION

According to the invention there is provided a land vehicle suspension control system comprising means for measuring forces acting between the sprung mass of said vehicle and unsprung masses as connected thereto;

means for producing signals proportional to the resulting measured force values;

means for determining from said signals the values of the forces required to be applied between said unsprung masses and the sprung mass to minimize force changes experienced by said sprung mass;

means for determining the values of demanded relative velocities required between the sprung mass and said unsprung masses to satisfy said force requirements; and means for applying said required forces between said unsprung masses and the sprung mass of the vehicle in proportion to said values of said relative velocities required between the sprung mass and said unsprung mass.

It is advantageous, in accordance with accepted theory relating to control systems, to have some form of feedback measurement of the relative velocity between the sprung mass and each unsprung mass respectively.

However, in the field of motor vehicles, it is necessary to minimize the size, weight and complexity of components, and it is further a requirement that the feedback measurements are accurately and rapidly obtained.

The present invention relates to a land vehicle suspension control system comprising an actuator connected between a sprung mass of the vehicle and an unsprung mass of the vehicle which actuator comprises a piston movable within a cylinder and dividing the cylinder into at least two chambers; a source of pressurized fluid; an exhaust for fluid; a valve mechanism controllable by a control signal for selectively connecting at least one of the chambers to the source of pressurized fluid or the exhaust for fluid and for controlling the rate of flow of fluid to and from the chamber; a sensor device for determining forces applied to the sprung mass by the actuator and the unsprung mass and for generating signals corresponding thereto; a processor device for processing the signals generated by the sensor device and for generating a velocity demand control signal to control the valve mechanism, the velocity demand signal demanding a relative velocity between the sprung mass and the unsprung mass and the valve mechanism controlling the flow of fluid to the actuator in response to the velocity demand signal; a mechanism for measuring the extension of the actuator, and for generating a signal corresponding thereto; a device for calculating from the velocity demand signal generated by the processor device a calculated position signal corresponding to an extension required of the actuator; a device for comparing the calculated position signal with the signal generated by the mechanism for measuring the extension of the actuator and for generating an error signal proportional to the difference therebetween; wherein the velocity demand signal generated by the processor device and the error signal are both used to control the valve mechanism, the valve mechanism being controlled to drive the error signal towards zero.

Preferably, the land vehicle suspension control system further comprises a device for integrating the error signal and the integrated error signal is also used to control the valve mechanism, the valve mechanism being controlled to drive the integrated error signal to a zero means value.

Preferably, the valve mechanism is a control valve which restricts the flow of fluid in direct proportion to the magnitude of the current of the input signal to the valve mechanism.

BRIEF DESCRIPTION OF THE DRAWINGS

The invention will now be described by way of example with reference to the drawings, in which.

DETAILED DESCRIPTION OF THE PREFERRED EMBODIMENT

Figure 1:
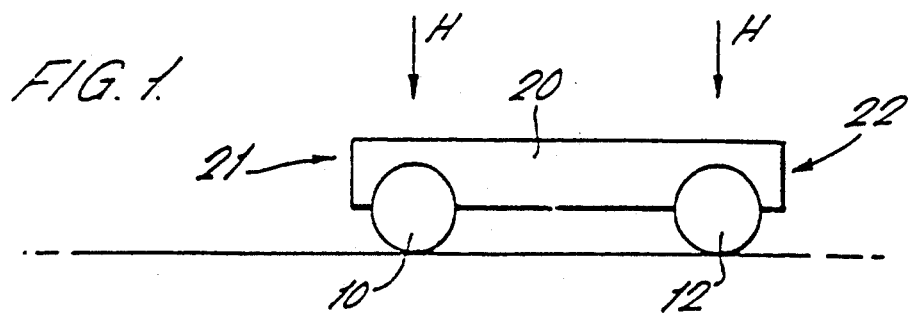
FIG. 1 is a schematic representation of the effects of heave forces on a motor vehicle body.

Referring to the drawings, FIGS. 1 to 4 show schematically a vehicle comprising a sprung mass in the form of a motor vehicle body 20 and four unsprung masses, i.e. four wheels 10, 11, 12, 13 and an interconnecting suspension system (not shown) for the wheels. The vehicle body 20 includes the engine, transmission and all the ancillary components of the motor vehicle.

FIGS. 1 to 4 are schematic representations of the typical displacements of the vehicle body 20 occasioned by heave, pitch, roll and warp forces respectively. In FIGS. 1 to 4 the front left hand wheel of the vehicle is referenced 10, the front right hand wheel is referenced 11, the rear left hand wheel is referenced 12, and the rear right hand wheel is referenced 13. The heave, pitch, roll and warp forces are respectively indicated by arrows H, P, R and W. The modal forces shown in FIGS. 1 to 4 are indicated acting positively according the sign convention adopted. The front of the vehicle is indicated generally by the reference 21, and the rear by reference 22.

In FIG. 1 the modal force of heave is an equal downward force acting on the four points of support of the vehicle body 20 on the wheels 11, 12, 13 and 14, and thus the vehicle body tends to move uniformly downwardly without tilting in any direction under the influence of positive heave.

Figure 2:
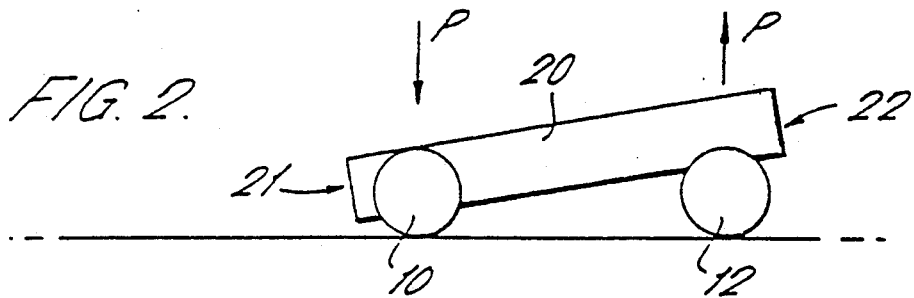
FIG. 2 is a schematic representation of the effects of pitch forces on a motor vehicle body.

Positive pitch modal forces are illustrated in FIG. 2 where it is shown that a positive pitch modal force applied to the vehicle body 20 tends to result in downward displacement of the front end 21 of the body with no tilting from side to side, and with the rear 22 of the vehicle being displaced upwardly from its original position.

Figure 3:
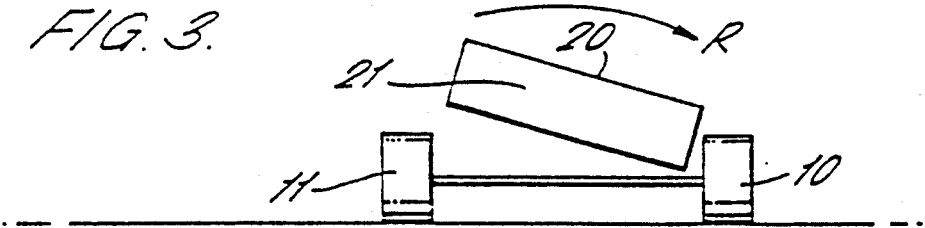
FIG. 3 is a schematic representation of the effects of roll forces on motor vehicle body.

The positive roll modal force is shown in FIG. 3 as tending to produce a tilting displacement of the vehicle body about its longitudinal axis, with downward displacement of the left hand side of the vehicle body 20 and upward displacement of the right hand side.

Figure 4:
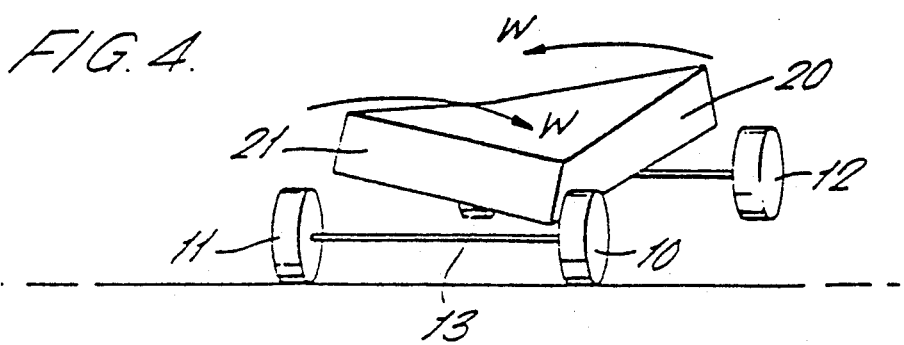
FIG. 4 is schematic representation of the effects of warp forces on a motor vehicle body.

FIG. 4 shows the effect of a positive warp force on the vehicle body 20. A warp force tends to displace one pair of diagonally opposite corners of the vehicle body 20 downwardly and the other pair upwardly in the case of a generally rectangular body.

According to the sign convention used herein, the front left and rear right corners of the vehicle are downwardly displaced for positive values of warp forces.

Clearly the magnitude of a displacement caused by warping is small, due to the torsional rigidity of the vehicle body itself. The other three modal body forces described above, may depending on the stiffness of the suspension between the body and the wheel/hub assemblies, produce large deflections of the body from its initial position.

The true warp force may not, therefore, necessarily be simply the combined application of pitch and roll forces, and is analyzed in its own right during operation of a control system in accordance with the invention.

Figure 5:
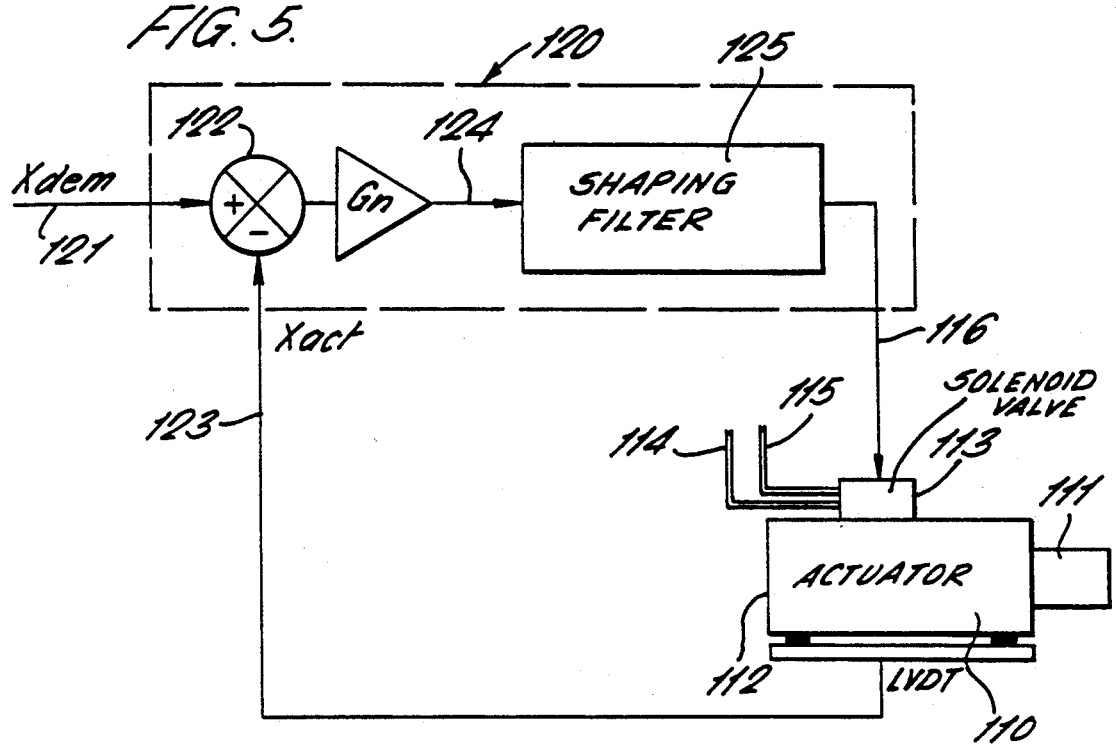
FIG. 5 is a schematic block diagram representation of a portion of a known control system.

Referring now to FIG. 5 there is shown a schematic block diagram representation of a portion of a known land vehicle suspension control system for controlling the attitude of the vehicle.

In FIG. 5 there is shown as hydraulic actuator 110 secured, for example, to operate between the sprung mass and an unsprung mass of a vehicle. The sprung mass of the vehicle is formed as the vehicle body (not shown) and the unsprung mass may be a wheel/hub assembly (not shown).

The actuator has a rod 111 to which is secured the vehicle body, the wheel/hub assembly being secured on the housing 112 of the actuator.

The actuator 110 operates in response to movements of a solenoid valve 113 controlling the distribution of hydraulic fluid in hydraulic supply lines 114 and 115, which fluid is arranged to act on the piston of the actuator 110.

The actuator 110 is preferably a double-actuating electro-hydraulic actuator, comprising a sealed cylinder and a piston attached to a connecting rod. The sealed cylinder is capable of containing high pressure fluid without significant leakage. The piston is attached to the connecting rod and is housed within the cylinder. The piston divides the cylinder into two chambers. The piston is fitted with seals to prevent significant leakage of the fluid from one chamber to another.

The solenoid valve 113 is preferably a four port flow control valve, or electro-hydraulic servo valve (EHSV). The solenoid valve 113 preferably has two input and two output ports. One port is connected to a source of high pressure hydraulic fluid, the other input port is connected to a return path which is held at low pressure. The EHSV is designed such that when an electrical current is passed through its energizing coil, hydraulic fluid is allowed to flow from the high pressure source to a chamber on one side of the piston contained in the actuator 110, whilst hydraulic fluid is allowed to flow from the other chamber, on the other side of the piston, to the return path. This causes the piston to move relative to the cylinder with a velocity proportional to the electric current applied to the energizing coil and the load reacted by the differential pressure across the piston. When the polarity of the current is reversed the velocity of the piston is reversed. If the EHSV conforms to the ideal, then the velocity of the piston will be zero when the electrical current applied to the energizing coil is zero.

Solenoid valve 113 operates under the command of an electrical signal carried by line 116, which is the output of a control system, indicated generally by the reference numeral 120.

The actuator 110 is designed under the assumption that the pressure of the fluid source is constant and sufficiently high that any pressure drop across the piston can be neglected. When this is the case, then the velocity of the piston relative to the cylinder is proportional to the current passed through the energizing coil. The constant of proportionality is known as the actuator "gain". Its value depends on the actuator cross-sectional area, the maximum flow capacity of the EHSV and the fluid supplied pressure. Mathematically, the relationship can be stated as follows;

$$DX = g_h \times i_{servo}$$

where
DX is the actuator velocity
$i_{servo}$ is the current passed through the energizing coil
$g_h$ is the actuator gain.

It is normal to connect the energizing coil of an EHSV to a current amplifier, such that the actuator velocity is proportional to the voltage applied to the current amplifier. When the gain of the current amplifier is unity (a unit voltage generating a unit current), then the relationship between the voltage applied to the amplifier and the actuator velocity may be written as follows:

$$DX = g_h \times v_{dem}$$

where $v_{dem}$ is the voltage applied to the current amplifier.

It should be noted that electro-hydraulic actuators are not perfect transducers. Offsets can occur within an EHSV and within a current amplifier used to provide $i_{servo}$. This means that a zero voltage input to the current amplifier may result in a non-zero velocity of the piston.

It should also be noted that compliance of the fluid contained within the cylinder will also effect actuator performance at high frequency. Further, in an active suspension system the pressurized hydraulic fluid is provided by a pump operating from engine output. Therefore, a significant change in engine speed can cause substantial fluctuations in hydraulic supply pressure. Also, since in automobile applications it is required that power consumption is minimized, generally an undersized actuator is adopted, resulting in substantial variations in pressure differential across the piston and a consequent variation in actuator performance. The control system for an actuator must be designed to maintain a satisfactory actuator performance under all, or at least most, conditions.

In FIG. 5 the control processor of the active suspension system outputs an actuator position command $X_{dem}$. It is therefore necessary to provide an additional circuit which functions to convert the actuator position command into an actuator velocity demand. The simplest and most common technique for effecting this processing is to construct a "displacment error loop". Such a system is shown in FIG. 5, with a slight improvement on the basic system being the inclusion of a "shaping filter". The shaping filter is commonly a "lead/lag" filter.

Control system 120 represents the output stage of a larger control system, which produces as its output a demanded position Xdem of the actuator 110. The $X_{dem}$ signal is carried by line 121 and is summed in summing junction 122 with the negative value of the measured actuator position Xact carried by line 123. Xact is measured by transducer means, such as a Linear Variable Differential Transducer LVDT, associated with actuator 110 to produce an electrical signal related to the position of rod 111 relative to actuator housing 112.

The transfer function of the displacement error loop of FIG. 5 can be written:

$$\frac{1 + S\,T1}{[1 + S/(Gh - Gn)] \cdot [1 + sT2]}$$

Typically the time constant T1 will be greater than the value of T2 and will be set so that:

$$T1 = 1/(Gh.Gn)$$

Figure 6:
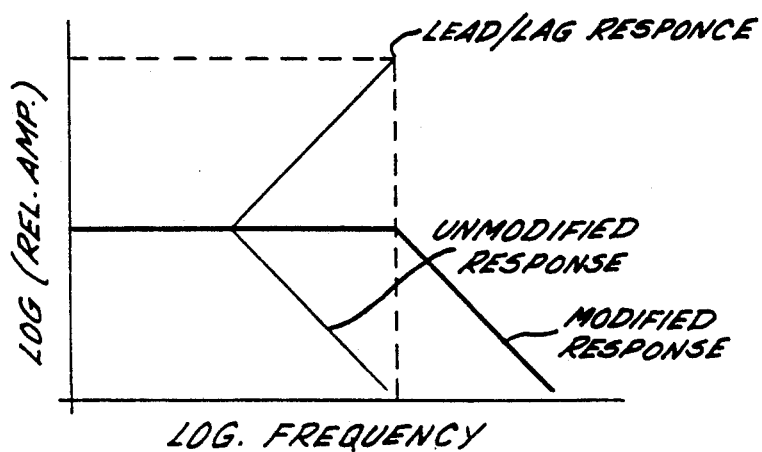
FIG. 6 is a graphical representation of the output characteristics of the control system of FIG. 5.

When this equality has been achieved, the transfer function of actuator motion will revert to single pole low pass filter. The system has an advantage over a system without a "shaping filter" in that the break frequency of the Displacement Error Loop can be increased by setting the value of T2, typically the break frequency is increased by a factor of 3 by including the "shaping filter". The logarithm of the gain of the system is plotted against the logarithm of the frequency of the system in FIG. 6. The figure also shows the frequency response of a displacement error loop without a "shaping filter" and the frequency response of the lead/lag network of the "shaping filter".

It can be seen from the graph that response of system is limited by the necessity for including a Displacement Error Control Loop to convert the position control signal $X_{dem}$ in to a velocity control system. Whilst the break frequency can be increased by increasing the gain of the system said increases are limited by problems of instability.

The frequency response of the electro-hydraulic actuator 110 can be dramatically improved if the control processor is arranged to output a velocity rather than a displacement demand. When this is the case, the primary input to the current amplifier is the velocity demand and the performance of the actuator is therefore not limited by the need for a displacement error control loop.

It is necessary to maintain the position of the actuator accurately. Hence, ancillary control loops must be added to the control system when a velocity demand signal is produced by the system controller. For example, it is necessary to generate from the velocity demand signal an estimate of the required actuator position, this being compared with the actual displacement of the actuator in a low gain displacement error loop. Also, it is necessary to counter the bias of the actuator and its current amplifier so that a zero velocity demand yields a zero actuator velocity.

Figure 7:
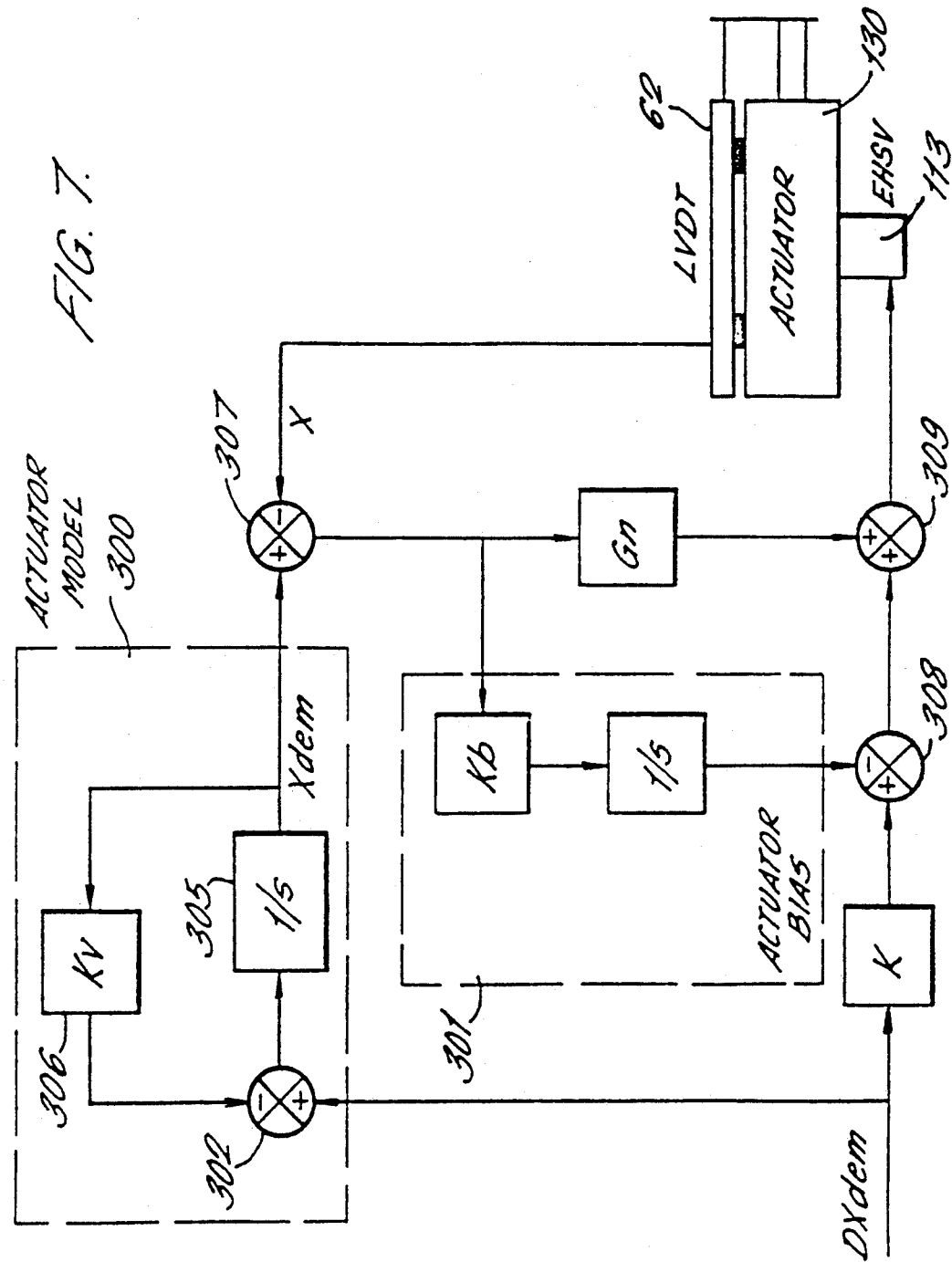
FIG. 7 is a schematic block diagram representation of a control system in accordance with the invention.

A schematic diagram of a control system according to the invention is shown in FIG. 7. This contains a forward velocity demand loop, an actuator "model" 300 and a slow bias estimator 301.

The input to the system is a demanded velocity $DX_{dem}$. This signal is input into the actuator model 300. The actuator model integrates the signal, as shown as 305, to give a position signal $X_{dem}$. The position signal is fed back through a low gain position feed back loop 306 to the junction 302. The feed back loop is necessary to force the average value of the integral to zero. Since the integral represents the modelled displacement of the actuator, over a period of time the displacement should average out to zero and hence it is necessary to ensure that the actuator model biases the displacement of the actuator towards zero.

The velocity demand loop of the invention feeds into the velocity demand signal two signals at junctions 308 and 309. The first of these is a signal proportional to the difference between the actual actuator displacement X and the modelled actuator displacement $X_{dem}$. This signal is added to the $DX_{dem}$ signal at 309 and adjusts the velocity demanded of the actuator to compensate for any differences between the modelled displacement and the actual displacement.

The actuator bias estimator 301 integrates the displacement error to generate an estimate of the actuator offset. The offset signal is added at 308. This signal acts to compensate for the bias of the actuator.

The values of the parameters kv and kb are chosen to be sufficiently small so as not to interfere perceptibly with the operation of the actuator and its control loops. Again the gain of forward velocity loop is denoted by k and is chosen as a suitable value when considering a particular system.

The invention has a major advantage over the prior art in that its frequency response is limited in no way by the need for a displacement error loop. The only limits imposed upon the frequency response of the velocity demand loop disclosed above are practical limits, imposed by digital filters within the active suspension control system, the frequency response of the valve and also the sampling rate of the controlling active suspension system.

The controlling equation for a velocity demand control loop, according to the invention, omitting the bias estimation and the actuator model position feed back loops, is as follows;

$$DX = K.DX_{dem} + Gn.[X_{dem} - X]$$

where,
DX is the actuator velocity
$DX_{dem}$ is the demanded velocity
$X_{dem}$ is an estimate of demanded position
K is the "forward" loop gain
Gn is the displacement error loop gain.

The transfer function of the arrangement can be written:

$$\frac{Gn + s \cdot K}{Gn + s}$$

Clearly, with K set to unity (i.e. the forward loop gain adjusted so that the performance of the model is matched to that of the actutor) the transfer function collapses to unity.

Figure 8:
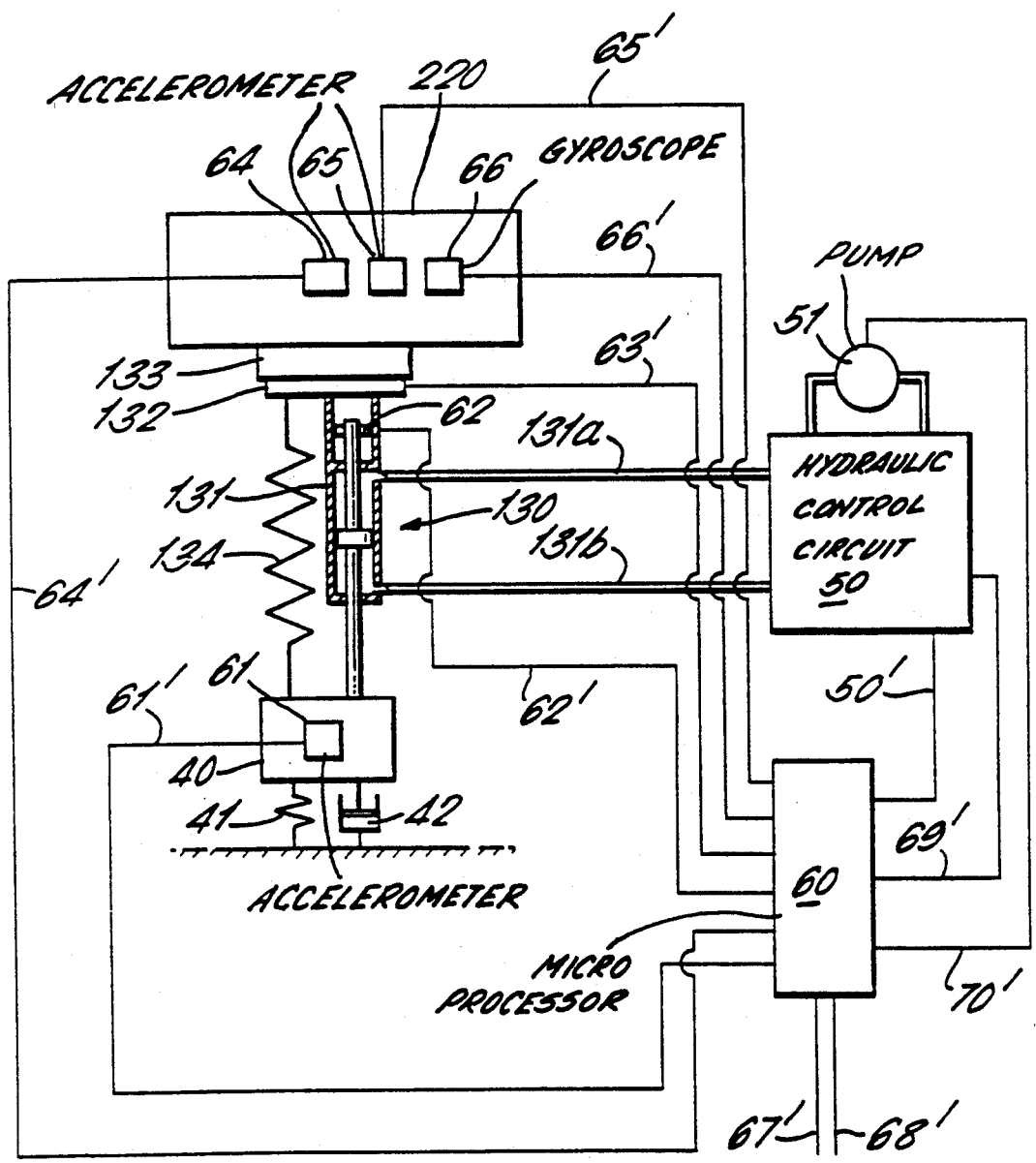
FIG. 8 is a schematic representation of a portion of a control system according to the invention.

Referring now to FIG. 8, there is shown a schematic representation of a vehicle active suspension control system.

The arrangement of FIG. 8 represents one quarter of the control system of a four-wheeled vehicle, one unsprung mass in the form of a wheel/hub assembly being shown, the system for the remaining three unsprung masses being similar.

In FIG. 8, the sprung mass of the vehicle in the form of the vehicle body 220 is shown supported on a number of suspension components indicated generally by the reference sign 130, which are in turn supported on a wheel and tire modelled as an unsprung mass 40 supported on a spring 41 and a damper 42 representing the tire characteristics.

The suspension components 130 comprise a vertically aligned hydraulic actuator 131 secured at its upper end to a load cell 132 which is separated from the vehicle body 220 by an isolator 133, which may be, for example, a rubber block.

A spring 134 is shown connected in parallel with the hydraulic actuator 131. In a vehicle where the active suspension components assist the conventional suspension components, the spring 134 represents the road spring of the vehicle. Where the active suspension components replace the conventional components of the vehicle suspension system, the spring 134 can be taken to model the spring stiffness of the active suspension components.

The input and output ports of the hydraulic actuator 131 are connected via hydraulic pipework 131a and 131b to a hydraulic control circuit 50 including a suitable supply pump 51. The hydraulic circuit 50 operates, via electrical connection 50', under the command of a microprocessor 60 which produces a demanded output of the actuator 131 in response to a number of measured inputs.

The inputs to the microprocessor 60 are as follows:
Line 61' carries the output of accelerometer 61 measuring the vertical acceleration of the unsprung mass 40;
Line 62' carries the output of linear variable displacement transformer (LVDT) 62 measuring the displacement of actuator 131;
Line 63' carries the output of load cell 32 measuring the force transmitted to sprung mass 20 via the suspension components 130;
Line 64' carries the output of accelerometer 64 located near the sprung mass center of gravity and measuring the sprung mass longitudinal acceleration;
Line 65' carries the output of accelerometer 65 located near the sprung mass center of gravity and measuring the sprung mass lateral acceleration;
Line 66' carries the output of gyroscope 66 located near the sprung mass center of gravity and measuring the sprung mass yaw rate (i.e. rotational acceleration);
Line 67' carries a vehicle speed signal from measuring means (not shown);
Line 68' carries a steering rack displacement signal from measuring means (not shown);
Line 69' carries a hydraulic system pressure signal from measuring means (not shown): and
Line 70' carries a swash plate angle signal from measuring means (not shown) located in the pump 51.

The active suspension system described above comprises two principal elements, one element synthesizer an enhanced suspension to react to road inputs, the other element controls the average position of the unsprung masses relative to the sprung mass. In principle, the two elements can be considered as defining the requirements for two separate sets of actuators, the X sets being arranged to act in series. When considering a vehicle as a whole, the control system considers eight logical actuators, but controls four physical actuators. The element of the control system dealing with road inputs synthesises four "modal" spring and damper units reacting to the road inputs. A velocity demand is then output from the controller, demanding a velocity from the actuator to react to the road inputs.

To deal with steady state inputs from driving conditions such as cornering, braking and accelerating, the control system also considers theoretically a set of actuators, each of which acts in series with one of the actuators reacting to road inputs. In practice, both the signal controlling the by the road and the signals controlling the actuators in response to steady state loads arriving from aerodynamic forces, cornering, etc., are both input to the same actuators, even though the system considers the actuator as being two separate actuators acting in series. The control system acts to alter the average actuator position in response to the steady state input, so that the suspension system does not deflect in response to such inputs.

The active suspension control system mentioned above has two velocity outputs DXd and DXs. DXd is the velocity demand output to the actuators in response to road impulses. DXs is the velocity demand output to the actuator in response to steady state loads on the vehicle. Therefore the total velocity demand output to an actuator is a sum of two components as follows;

$$DXo = DXd + DXs$$

As described before the velocity demand loop of the invention models actuator displacement. In the active suspension system employed by the applicant the total model displacement is in fact the sum of two model displacements, Xd and Xs. Xd is the model displacement of the actuator in response to road inputs. Xs is the modelled actuator displacement in response to steady state inputs. The total model displacement Xo is the sum of two as follows:

$$Xo = Xd + Xs$$

In the active suspension system in fact each of the four actuators used to control the fourth wheel and hub assemblies are controlled individually, but for purposes of simplicity, we shall only consider the control of one such actuator.

As mentioned before, in general an actuator and its associated current amplifier will have small offsets, so that a zero velocity demand will not yield zero actuator velocity. An estimate of the offset value can be obtained integrating the actuator displacement error, that is to say the difference between the demanded and actual displacement. The estimates can then be included in the control system to maintain more accurate control. In a preferred embodiment of the invention, the offset value is estimated by a recursive equation as follows;

$$Xb = Xb + Kb(Xo - Xr)$$

where
Xb is the EHSV bias estimate

Kb is a scale or integration constant
Xr is the actual actuator displacement.

In a vehicle suspension system the performance of an electro-hydraulic actuator is also dependent upon the fluid supply pressure. This can vary substantially in a vehicle, to the extent that it is necessary to introduce a further factor in to the control of the actuators to reduce the variation in performance of the actuators with changes in supply pressure. The factor PRfact adjusts the velocity demand signal to account for the variations in the supply pressure.

The PRfact factor and the offset factors are combined into the velocity demand loop of the invention described earlier. The current amplifier input voltage, which results in the displacement of the actuator is finally computed as being the following;

$$PRfact.(Gf.DXo + Gd.(Xo - Xr) + Xb)$$

It can be seen from the equation that the active suspension system used by the applicant modifies the velocity demand to compensate for bias errors and fluctuations in the hydraulic fluid supply pressure.

The main advantage of the invention is that the frequency response of the control system is vastly improved over the position demand control systems of the prior art. The invention overcomes the difficulties of restricted band width response imposed by the position control loops of the prior art. In fact, the frequency response of the present invention is only limited by practical considerations, such as filtering necessary in the active suspension control system, the frequency response of the servo valve in actuator and also the sampling rate of the active control systems.

Although the present invention has been described with reference to preferred embodiments, workers skilled in the art will recognize the change may be made in formal detail without departing from the spirit and scope of the invention.

What is claimed is:

1. A land vehicle suspension control system comprising:
    an actuator connected between a sprung mass of the vehicle and an unsprung mass of the vehicle, which actuator comprises a piston movable within a cylinder and dividing the cylinder into at least two chambers;
    a source of pressurized fluid;
    an exhaust for fluid;
    valve means controllable by a control signal for selectively connecting at least one of the chambers to the source of pressurized fluid or the exhaust for fluid and for controlling the rate of flow of fluid to and from the chamber;
    sensor means for determining forces applied to the sprung mass by the actuator and the unsprung mass and for generating signals corresponding thereto;
    processor means for processing the signals generated by the sensor means and for generating a velocity demand control signal to control the valve means, the velocity demand signal demanding a relative velocity between the sprung mass and the unsprung mass and the valve means controlling the flow of fluid to the actuator in response to the velocity demand signal;
    means for measuring the extension of the actuator, and for generating a signal corresponding thereto;

means for calculating from the velocity demand signal generated by the processor means a calculated position signal corresponding to an extension required of the actuator;

means for comparing the calculated position signal with the signal generated by the means for measuring the extension of the actuator and for generating an error signal proportional to the difference therebetween; and wherein the velocity demand signal generated by the processor means and the error signal are both used to control the valve means, the valve means being controlled to drive the error signal towards zero.

2. A land vehicle suspension control system as claimed in claim 1 further comprising means for integrating the error signal and the integrated error signal is also used to control the valve means, the valve means being controlled to drive the integrated error signal to a zero mean value.

3. A land vehicle suspension system as claimed in claim 1 wherein the valve means is a control valve which restricts the flow of fluid in direct proportion to the magnitude of the current of the input signal to the valve means.

* * * * *